United States Patent Office 2,789,114
Patented Apr. 16, 1957

2,789,114

TRIETHYLAMINE SALT OF N-(2-PYRIDYL)-DITHIOCARBAMIC ACID

Bryant C. Fischback, Walnut Creek, and Guy H. Harris, Concord, Calif., assignors to The Dow Chemical Company, Midland, Mich., a corporation of Delaware No Drawing. Application October 28, 1955,
Serial No. 543,619

1 Claim. (Cl. 260—294.8)

The present invention is concerned with the triethylamine salt of N-(2-pyridyl)-dithiocarbamic acid of the formula

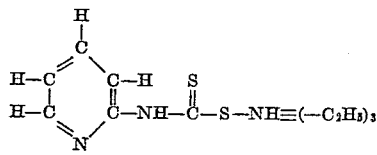

This compound is a crystalline solid which is somewhat soluble in many organic solvents and very soluble in water. The new compound is useful as an intermediate for preparation of N-(2-pyridyl)-isothiocyanate in excellent yield. In such use, substantially equimolecular proportions of the triethylamine salt of N-(2-pyridyl)-dithiocarbamic acid, and lead nitrate are mixed and blended together in water at temperatures of from 20° to 45° C. Following the reaction, the reaction mixture may be steam distilled to separate the isothiocyanate as a crystalline solid melting at 109°–110.5° C. The new trialkyl amine salt of N-(2-pyridyl)-dithiocarbamic acid is also useful as a parasiticide and adapted to be employed as an active toxic constituent of compositions for the control of insects, bacteria and fungi such as *Rhizoctonia solani* and *Fusarium spp.* For such use, the compounds may be employed as constituents of aqueous and solvent solutions or in mixture with inert finely divided powders.

The new compound may be prepared by reacting together (a) 2-aminopyridine, (b) carbon disulfide, and (c) triethylamine. The reaction conveniently is carried out in an inert organic solvent in which the desired triethyl ammonium N-(2-pyridyl)-dithiocarbamate is insoluble, and preferably in a low boiling solvent such as diethyl ether, diisopropyl ether or n-pentane. Good results are obtained when substantially equimolecular proportions of the reactants are employed. In a preferred operation, optimum yields are obtained when employing small excesses in the amount of ten percent each of the triethylamine and carbon disulfide reagents.

In the foregoing method, the triethylamine and 2-aminopyridine may be dispersed in the reaction solvent and the carbon disulfide added portionwise thereto. In an alternative procedure, the triethylamine, 2-aminopyridine and carbon disulfide are combined and blended together in the reaction solvent. The reaction is somewhat exothermic and takes place smoothly at temperatures of from 20° to 50° C. The temperature may be controlled by the addition or subtraction of heat as may be required. In a convenient method of operation, the reaction is carried out at the boiling temperature of the reaction mixture and under reflux. During the reaction, the desired product separates and solidifies in the reaction mixture as a crystalline solid. The latter may be separated by filtration and thereafter purified by conventional methods.

In a representative operation, 94.11 grams (1 mole) of 2-aminopyridine, 111.3 grams (1.1 moles) of triethylamine and 83.8 grams (1.1 moles) of carbon disulfide were dispersed in 0.5 liter of diethyl ether and the latter mixture set aside for several days at room temperature to complete the reaction. During this period a triethyl ammonium N-(2-pyridyl)-dithiocarbamate product separated and solidified in the mixture as a crystalline solid. The product was separated by filtration in a yield of 81.2 percent. The product melted at from 68° to 74° C. and contained sulfur and nitrogen contents of 23.78 and 15.27 percent respectively as compared to theoretical contents of 23.62 and 15.48 percent.

We claim:

The triethylamine salt of N-(2-pyridyl)-dithiocarbamic acid.

References Cited in the file of this patent

FOREIGN PATENTS 684,647 Great Britain _ _ _ _ _ _ _ _ _ _ _ Dec. 24, 1952